UNITED STATES PATENT OFFICE.

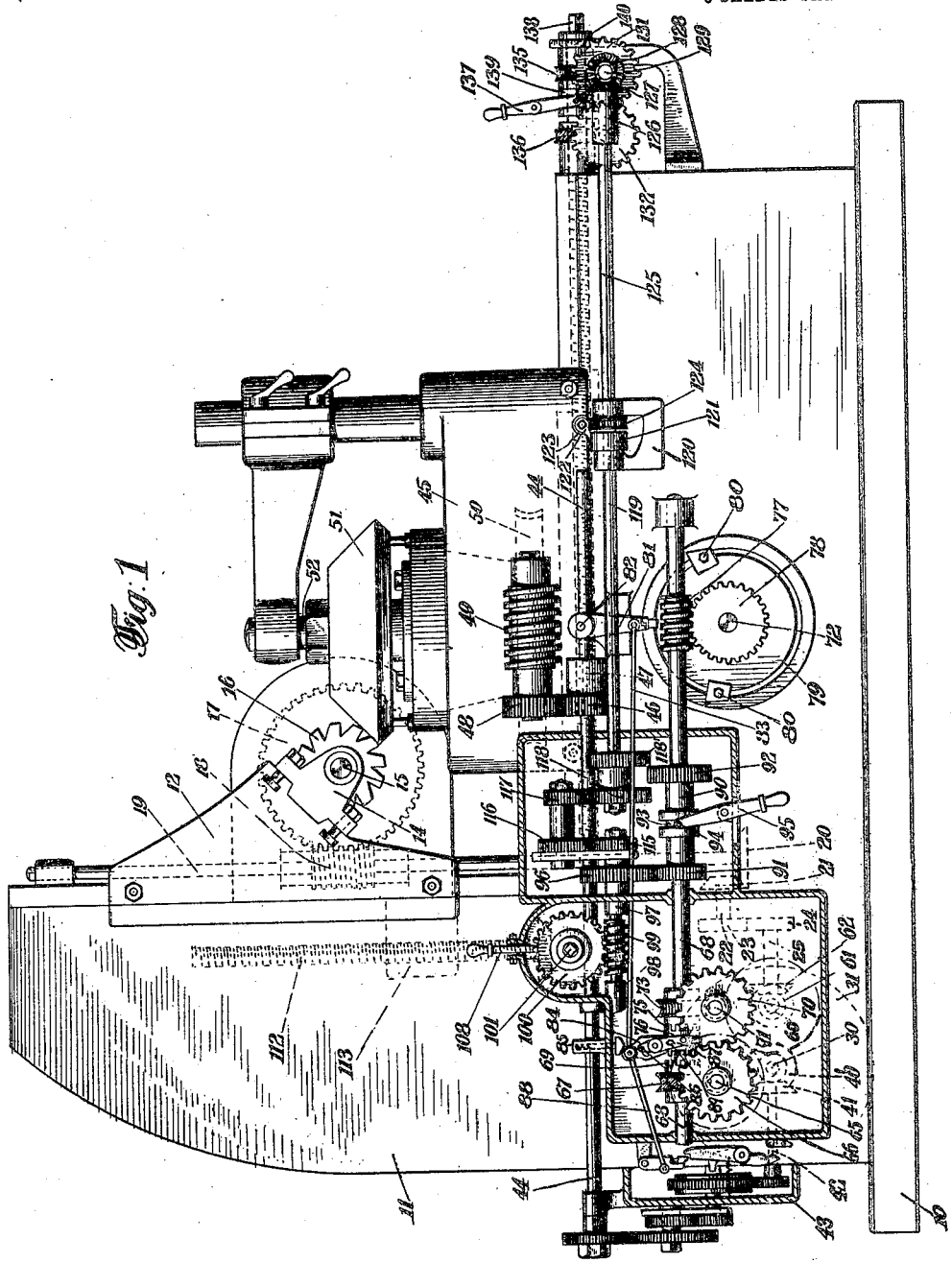

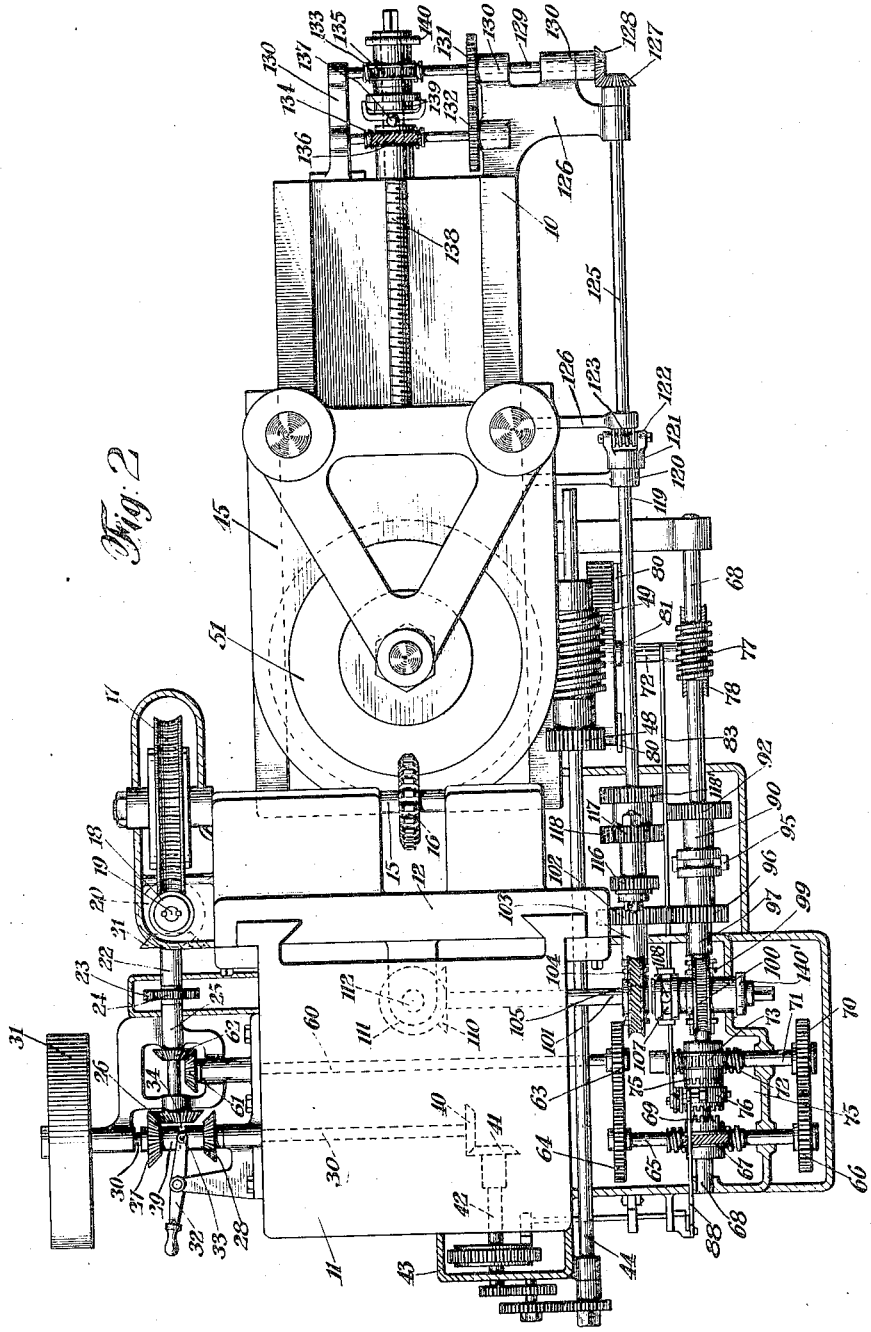

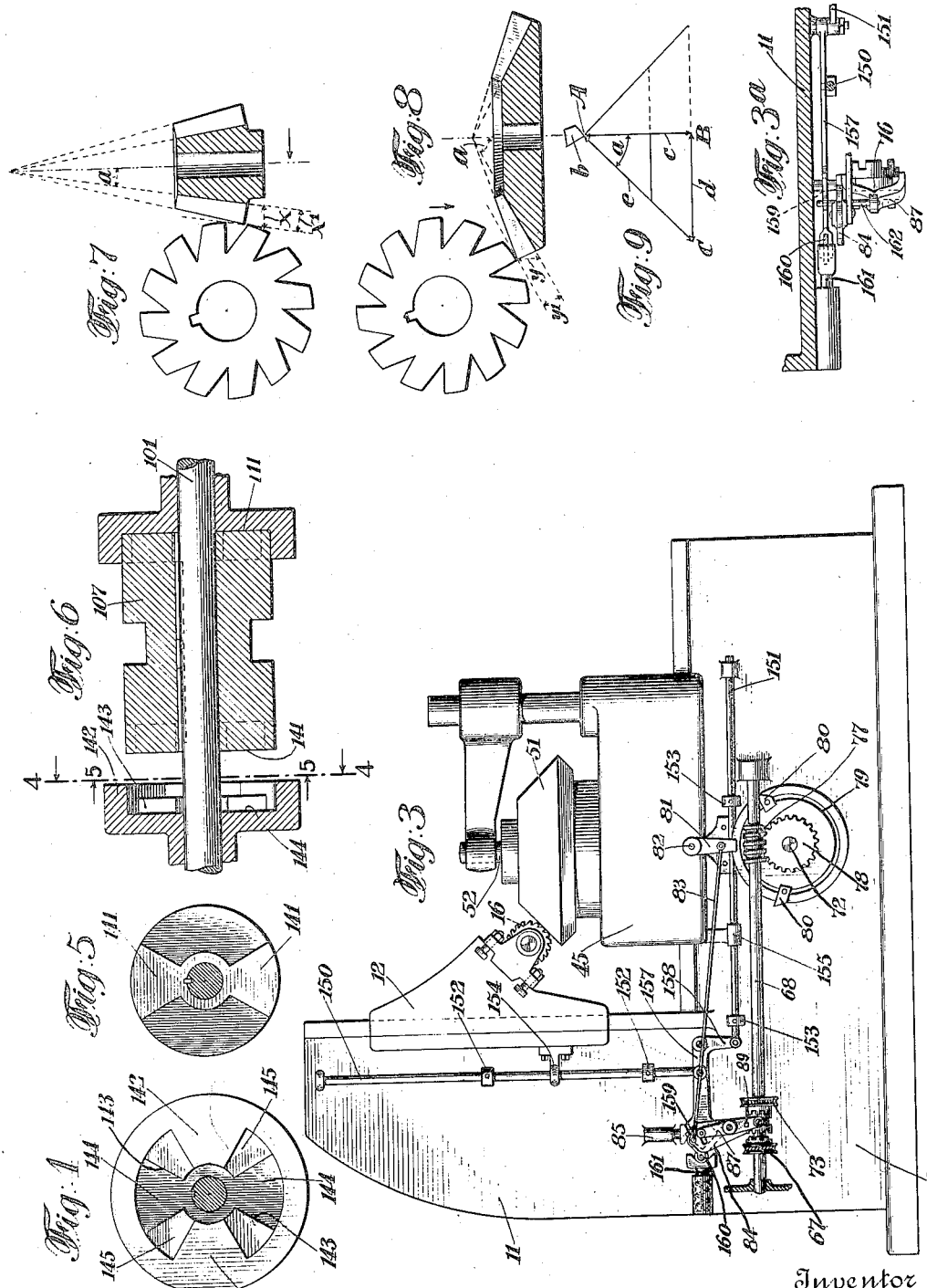

HENRY J. EBERHARDT, OF NEWARK, NEW JERSEY, ASSIGNOR TO NEWARK GEAR CUTTING MACHINE CO., OF NEWARK, NEW JERSEY, A CORPORATION OF NEW JERSEY.

GEAR-CUTTING MACHINE.

1,104,482.  Specification of Letters Patent.  Patented July 21, 1914.

Application filed October 6, 1911. Serial No. 653,172.

*To all whom it may concern:*

Be it known that I, HENRY J. EBERHARDT, citizen of the United States, and a resident of Newark, in the county of Essex and State of New Jersey, have invented certain new and useful Improvements in Gear-Cutting Machines, of which the following is a specification.

The invention relates to a method of and a machine for cutting the teeth of gear wheels, more particularly the teeth of bevel gear wheels, although the machine may also be readily adapted to the cutting of spur and face gears.

The invention has for its object to provide a gear cutting machine, particularly for the purpose of cutting bevel gears of any desired angle; and which will have a minimum of bearing and connections; and will permit of the elimination of a tilted bed and its accompanying mechanism, as heretofore employed for either the work or the cutter.

A further object of the invention is to enable the work and cutter bearings to be arranged close to the frame of the machine, whereby increased rigidity is obtained and the cutter driving and work indexing mechanism simplified.

The novel manner of effecting the cutting of bevel gears, as hereinafter set forth, introduces, furthermore, novel means for varying and obtaining the angular cut with mathematical precision. Novel mechanism, also, is provided for effecting the separation of the cutter and work on the return stroke, and for applying power to the fastener and for applying power to the fastener moving end of the angle producing change wheel train used; and for controlling the movement of both cutter and work carriages.

The nature of the invention will be best understood when described in connection with the accompanying drawings, in which—

Figure 1 is a side elevation of one form of a machine which may be employed to carry out the novel manner of cutting the teeth of bevel gear wheels. Fig. 2 is a plan view thereof. Fig. 3 is a side elevation, on a reduced scale, of a machine constructed according to my invention and equipped with means for limiting the travel of the work and cutter carriages. Fig. 3ª is a fragmentary detail plan of a portion of the limiting mechanism. Figs. 4 and 5 are detail sectional views taken on the lines 4—4, 5—5, Fig. 6, and looking respectively in the direction of the arrows. Fig. 6 is a detail sectional view illustrating a clutch arrangement. Figs. 7, 8 and 9 are diagrammatic views illustrating the principle of cutting bevel gears by the improved process.

Similar characters of reference designate corresponding parts throughout the several views.

Referring now to Figs. 1 and 2 of the drawings, the means for rotating the cutter at the desired speeds and direction will be described, the same embodying a novel construction for simultaneously reversing both cutter and feed trains. Extending vertically upward from the frame or bed 10 of the machine is a stanchion 11, which is preferably integral therewith. In this stanchion is mounted a cutter carriage 12, arranged to be vertically adjustable thereon and carrying a cutter support 14 axially adjustable therein and supporting a rotatably mounted cutter spindle 15. The cutter 16, of any suitable type, is arranged to be secured to and to be rotated by the said spindle 15 which is provided with a gear 17 rotating therewith and meshing with and driven by a worm 18. This worm is slidably mounted upon a shaft 19 and is suitably driven thereby. At the lower end of shaft 19 is a bevel gear 20 meshing with a bevel gear 21 on a shaft 22. At the other end of said shaft 22 is a change wheel 23 meshing with a corresponding change wheel 24 on a shaft 25. This latter shaft 25 carries at its other end a bevel gear 26, adapted to mesh with either of two bevel gears 27 and 28 which are rigidly connected to each other by means of a sleeve 29 slidably keyed on a shaft 30. Shaft 30 carries at its outer end a pulley 31 to which power is transmitted for operating the machine. The cutter 16 may be rotated in either direction by causing the corresponding bevel gear of the gears 27 and 28 to engage the gear 26, the said engagement being effected through the medium of a lever 32 and a pin 33 fitting a groove 34 in the sleeve 29. The driving shaft 30 is extended beyond the bevel gear 28, and carries at its inner end the bevel gear 40 meshing with a bevel gear 41 on a shaft 42. Shaft 42 furnishes power to a suitable indexing mechanism contained within a casing 43. This mechanism may be of any desired type, for example, such as that described in U. S. Letters Patent No. 878,051, granted to E. G. Eberhardt, February 4th, 1908 for mechanical movement, said mechanism being intermittent in its action. The use of intermittent acting indexing mechanism is not essential, however, to the present invention; for, if a special form of helical cutter, such as disclosed in U. S. Patent #867,342, granted to L. Boisard, October 1st, 1907, for cutter for straight, helicoidal and conical gear teeth, be employed, bevel gears may be cut therewith with the indexing wheels rotating continuously. The indexing mechanism drives in well-known manner the indexing shaft 44 which extends at the side of the machine to the workhead 45. Near the inner end of the said shaft, a gear 46 is slidably splined on the same and is adapted to be rotated by said shaft when it is turned by the indexing mechanism. The gear wheel 46 is, furthermore, arranged to rotate in a bearing 47 secured to workhead 45 and to mesh with a gear wheel 48 secured to the index worm 49. This worm is rotatably mounted upon the workhead 45; and, for the purpose of adjusting the same with respect to its mating worm wheel 50, is slidably mounted therein. The wormwheel 50 is rotatably mounted in the workhead 45 for the purpose of effecting the desired rotation of the work blank 51, mounted on a work arbor 52 in well-known manner. The hereinbefore described indexing train is similar to that generally employed in apparatus of the character set forth and its operation is well-known and understood. A feed shaft 60 extends across the machine and is driven from the shaft 25 through a gear wheel 61 secured to its inner end and meshing with a gear wheel 62 on the said shaft 25. The other end of shaft 60 carries a gear wheel 63 meshing with a gear wheel 64 on a worm shaft 65, which latter shaft carries also a feed change gear 66. The worm of shaft 65 meshes with a worm wheel 67 mounted on a clutch shaft 68 and provided with a square toothed clutch ring 69. The change gear 66 meshes with a gear 70 adapted to drive a worm shaft 71 meshing in turn with a wormwheel 73 on clutch shaft 68 and carrying a square toothed clutch ring 75. The velocity ratio of the gearing is such that the wormwheel 67 rotates faster than the wormwheel 73, and in opposite direction. The shaft 68 carries a double faced square toothed clutch 76 located intermediate of the two clutch rings 69 and 75 with which it is adapted to engage in well-known manner to effect the feeding motion and return motion of the cutting mechanism. At the other end of shaft 68 is a worm 77 meshing with a wormwheel 78 loosely mounted on a stud 72 secured in the frame 10. Wheel 78 is provided with a grooved member 79 in which are adjustably secured trip dogs 80; and in the path of these dogs extends a lever 81 loosely mounted on a stud 82 likewise secured to the frame 10. A connecting rod 83 is hingedly connected to a lost motion lever 84, acted upon by a spring pressed plunger 85, and through lever pin 86 to a clutch fork 87 operating in well-known manner the clutch member 76. In reversing the direction of feed and return, connecting rod 83 is to be attached to the lost motion lever 84 upon the opposite side of its fulcrum as at 89. A connecting rod 88 connects the lost motion lever 84 with the index mechanism in casing 43 for the purpose of releasing the same in the usual manner, when indexing intermittently. On the shaft 68 is slidably mounted a sleeve 90 carrying at its ends a gear 91 and a gear 92 respectively; and, intermediate of the same, the sleeve is provided with a groove 93 into which fits a pin 94 carried by a lever 95 fulcrumed to the frame 10 and adapted to move the sleeve along the said shaft. The wheel 91 is shown as meshing with a wheel 96 keyed to a shaft 97 mounted in a bearing 98 secured to the frame 10. The shaft 97 carries a worm 99 which meshes with a worm wheel 100 loosely mounted on a shaft 101 free to revolve in suitable bearings provided therefor in the stanchion 11. The shaft 97 also transmits power through the gear 96 and a gear 102 to a shaft 103 to which the said gear is keyed. This shaft 103 carries a worm 104 meshing with a worm wheel 105 likewise loosely mounted on the shaft 101. Both of the worm wheels 100 and 105 are provided with suitable clutch teeth, hereinafter more fully described. Slidably keyed to shaft 101 is a clutch member 107 which, through a lever 108, is caused to engage the clutch teeth of either worm wheel 100 or 105 and thereby transmit rotation to the shaft 101, the velocity ratios of the two wheels being different for the purpose hereinafter set forth. This shaft carries at its inner end a bevel gear 110 meshing with a similar gear 111 of a feed-screw 112 engaging a nut 113 secured to the cutter carriage 12. At the other end of shaft 103 is secured a ratio change wheel 115 meshing with a change wheel 116, and to which is also secured a change wheel 117 meshing with a change wheel 118. Change wheel 118 is keyed to a shaft 119, mounted in bearings 120 secured to frame 10, and upon which is secured a gear wheel 118'. At the other end of shaft 119 is keyed a hub 121 formed with worm bearings 122 which support a worm 123 meshing with a wormwheel 124 keyed to the end of a shaft 125 which is supported by bearings 126 secured to frame 10. A positive connection is thus secured between the two shafts 119 and 125 and one which will at the same time provide for an adjustment of one of said shafts with respect to the other. At the end of shaft 125 is a bevel gear wheel 127 meshing with a similar gear 128 of a shaft 129 supported by bearings 130 of the frame 10. This shaft drives a worm 133 secured to it, and through gear wheels 131 and 132 a worm 134. These worms engage respective wormwheels 135 and 136 which are provided with suitable clutch teeth and are loosely mounted on the work feed screw 138. A clutch member 139 is slidably keyed to the feed screw 138 between the two wormwheels 135 and 136 and is provided with suitable clutch teeth adapted to engage the teeth of either wheel 135 or 136 and thereby allow of rotating the feed screw at two different speeds, for the purpose hereinafter set forth.

In operating the machine for cutting spur gears, the work and cutter are mounted in the usual manner and the proper change gears inserted for the desired cutter speed and feed, and the work indexing. Gears 91 and 96 are maintained in mesh through lever 95; but the change wheel train 115, 116, 117 and 118 is disconnected and not employed. Either of the wormwheels 100 or 105 may be employed to effect the feed of the cutter, but the wheel 105, of lower ratio, for example 1 to 1, is preferably employed for that purpose. The workhead 45 is adjusted by dial 140 and through the feed screw 138, to the desired depth of cut, whereupon it is clamped in its ways. The trip dogs 80 are adjusted for the desired length of cutter carriage travel, and the cutter is caused to cut, preferably downward, by suitably connecting the bevel gear wheel 26 to the proper corresponding bevel gear wheel 27 or 28 by means of lever 32. The direction of feed is arranged, of course, to suit the direction of rotation of the cutter. In the cutting of face gears, the cutter, work, feed, speed and indexing gears are set in a similar manner to that employed in the cutting of spur gears, and the ratio change wheel train 115, 116, 117 and 118 is disconnected. Wheels 91 and 96 are separated through lever 95 and the cutter feed is disconnected; but wheel 92 is thrown in mesh with the wheel 118' on the shaft 119. By this means, through the rotation of shaft 119 and 125, the work table feed mechanism is operated. Either of the wormwheels 135 or 136 may be employed to effect the feed of the work table but the latter, of lower ratio, and for example, 1 to 1, is preferably employed. The cutter carriage 12 is adjusted, through dial 140', and feed screw 112, to the desired depth of cut, and is clamped to the stanchion 11. The trip dogs 80 are adjusted for the desired length of work head travel, and the rotation of the cutter is made to correspond to the direction of feed of the work table. In the cutting of bevel gears of any desired angle, included in the range between a spur and a face gear, the ratio change wheel train 115, 116, 117 and 118 is included, and the wheels 91 and 96, for example, are thrown in mesh. This will effect the feed of both the cutter and the work, the velocity ratio between the same determining the angularity of cut, as will hereinafter be more fully explained. When the work is to have the greater velocity, the wheel 91 is disengaged, through lever 95, from the wheel 96 of the ratio change train and at the same time the wheel 92 is thrown into engagement with the wheel 118' of said train. The above provision is for the purpose of more directly applying the power to that one of the two members which moves the faster. The wormwheels 100 and 135 are provided for their respective feeds, of a high velocity ratio, preferably 50 to 1, to obviate the necessity of employing large change wheels in the ratio change train when cutting bevel gears of small or large angle. The actual choice of the ratio change wheels is made more convenient for the operator by means of a cutting angle chart upon which all the necessary practical combination are placed; and it is proper to note in this connection that the ratios for angles from 0° to 45° are the reverse of the ratios for angles from 90° to 45°. The necessary combinations from 0° to 45° having been supplied on such chart, the change gears for the angles from 45° to 90° may be obtained therefrom by inverting these combinations. The determination of the proper speed ratio between the feed of the cutter and the feed of the work, will be best understood by reference to Fig. 9 of the drawings. If $a$ be the desired angle of cut, and $b$ designate the cutter for effecting a cut at the angle $a$, the motion of such cutter may be resolved into the two components $c$ and $d$ at right angles to each other. That is to say, if the cutter started at the point A and moved uniformly in the direction of line A B and through a distance $c$ represented by the said line, and if at the same time the work be uniformly moved away from said cutter along the line B C and through a distance $d$ represented by the said line B C, then the movement of the cutter with respect to the work will be along the line A C and through a distance $e$ represented by said line. The ratio $\frac{d}{c}$ will be equal to the tangent of the angle $a$ and may thus be readily determined for the various cutting angles in practical use by reference to a table of tangents. This velocity ratio gearing is so chosen for feeding the cutter and work, that the cutter will have one of the component velocities and the work, the other component velocity. To cut a bevel gear of 45° cutting angle, for example, the train of mechanism for feeding one component motion, will have the same ratio as the train of mechanism for feeding the other component motion and it is immaterial upon which end the power be applied. When the ratio is other than 1 to 1, it is productive of smoother action and less strain upon the parts to apply the power to that end of the ratio producing train, which moves the faster, as has already been explained. From determining the depth of cut, the work is brought to the cutting tool and is so adjusted with respect thereto that the latter slightly scores or surfaces the extreme outside diameter of the bevel blank. The work and cutter are then retracted from each other until they are fully separated from any cutting action and then are returned slightly to take up all backlash in the gearing train between two feed screws. In cutting angles of 45° and less, the workhead screw dial 140 is set at zero, the clutch disengaged and held in inoperative positive position, through lever 137, whereupon the workhead is advanced the required amount to obtain the desired cutting depth. In cutting bevel gears with angles greater than 45°, the adjustment is made in similar manner with respect to the cutter carriage. The actual amount to advance the workhead, in cutting teeth less than 45°, or the cutter carriage in cutting teeth greater than 45°, may be readily computed; and such amount may be placed on a suitable chart for standard tooth depths. In the former case, reference being had to Fig. 7, the amount $x$ to advance the workhead in a direction at right angles to the axis of the work, is obtained by multiplying the tooth depth $x'$ by the secant of the cutting angle $a$; whereas in the latter case, reference being had to Fig. 8, the amount $y$ to advance the cutter in a direction parallel to the axis of the work, is obtained by multiplying the tooth depth $y'$ by the cosecant of the cutting angle. When the cutting depth has been set and it is desired to reëngage the clutches, however, a difficulty sometimes presents itself, in that the clutch teeth may not be in exact position to engage. To overcome this feature and to bring the teeth into coincidence without disturbing the relative positions of the cutter carriage and workhead, the worm 123 and wormwheel 124 are provided to adjust one of the shafts 119 or 125 the required amount with respect to the other. At the completion of the feeding stroke of the cutter, the same is returned, for example, upwardly; and the workhead toward the stanchion. As it is mechanically impossible to maintain the cutter and work feeding trains of mechanism free of backlash, it is obvious, that should the workhead return slightly in advance of the cutter carriage, the work will return past the cutter in a slightly different position with respect thereto than it had when feeding. This will cause an imperfection in the cut which must be avoided. To entirely overcome this tendency of one member to return in a slightly deeper path than when feeding, it is preferable to provide the clutch teeth on the wormwheels 135 and 136 of the work head screw 138 with lost motion. The workhead will thereby be obliged to remain stationary for a short period and until the cutter carriage has commenced its return motion. With slender work it is often desirable to cut in the opposite direction; and, in this case, the cutter carriage will feed upward and the workhead toward the stanchion. The cutter carriage is then given a period of rest by similarly providing the clutch teeth of the wormwheels 100 and 105 with lost motion. Thus, when the cutter is arranged to feed away from the apex of the work, a rest period is provided in the workhead feeding train; and when the cutter feeds toward the apex of work, a rest period is provided in the cutter carriage train. The lost motion may be provided at any suitable point of either feed train; but with the construction illustrated it is more convenient to provide the same in the clutches, as set forth.

Figs. 4 to 6 illustrate in detail one form of clutch suitable for the above requirement, the clutch 107 of shaft 101 being shown. Teeth 141 are provided on the opposite faces of clutch 107, and are adapted to coact with corresponding teeth 142 or 143 of the wormwheel clutches. The latter teeth are at a lower depth than the former, and the spaces 144 between the same are equal to the width of teeth 141. The spaces 145 between the upper teeth 142, however, are somewhat wider than the width of teeth 141 to provide the desired amount of lost motion. The clutch teeth controlling the movement of the particular carriage which is to be given the period of rest are brought into engagement with the upper set of teeth of the corresponding wormwheel, and the clutch controlling the movement of the other carriage with the lower teeth of the corresponding wormwheel.

As the herein described machine is provided with means for feeding both cutter carriage and workhead in either direction, it is desirable to provide a safe limit to their lengths of travel. When this is required, mechanism, as illustrated in Figs. 3 and 3ª, may be added to that already described. The tripping mechanism including the dogs 80, lever 81, connecting rod 83, lost motion lever 84, and the clutch fork 72 are retained. In addition to this mechanism, however, a vertical sliding rod 150 and a horizontal sliding rod 151 are arranged in suitable bearings secured to the stanchion and the frame respectively. Upon these rods are secured fixed stops 152 and 153 respectively, and the same are adapted to be engaged respectively by a member 154 moving with the cutter carriage 12 and a member 155 moving with the workhead 45 when either of these members exceeds a safe limit of travel. The rod 150 is pivotally connected to an arm 157, and the rod 151 similarly to an arm 158, of a bell crank lever pivoted to the frame of the machine. Arm 157 terminates in a cam or diamond shaped opening 159 and carries a roller 160 engaging a spring pressed plunger 161 to retain the said lever in its normal inoperative position. A pin 162, extending within the cam shaped opening, is connected to the clutch fork 87 and so long as the bell crank is held in its normal position it has no effect on the said clutch fork. When, however, the cutter carriage or the workhead exceeds its limit of travel in either direction, the corresponding stop will be engaged and move either the rod 150 or the rod 151. This motion is transmitted to the bell crank, and through the surface of the cam opening engaging pin 162, finally to the clutch member 76 to move the same out of engagement with the corresponding teeth and into a neutral position. This causes the feed and return motion of either or both the cutter carriage and the workhead to be stopped.

It will be evident that many changes in the arrangement of parts and means of transmitting the feed and return motion may be made within the scope of the claims, in the machine herein set forth, by those skilled in the art, without departing from the spirit of my invention. I, therefore, do not wish to be restricted to the particular mechanism illustrated and herein described as one means of carrying out my invention.

I claim:—

1. In a bevel gear cutting machine: a cutting element and a work element; means to impart feeding motion to one element; means to simultaneously therewith impart a further feeding motion to one element at an angle to said former feeding motion; means to vary the velocity ratio between said feeding motions; and additional means to effect a change of velocity ratio between said feeding motions.

2. In a gear cutting machine: a cutter carriage, and a suitable cutter carried thereby; a workhead adapted to retain the blank to be cut; a feed train to impart a feeding motion to said cutter carriage; a feed train to impart a feeding motion to said workhead simultaneously with the feed of said cutter carriage; a ratio change train intermediate of said two feed trains to vary the velocity ratio between the feeds imparted to said cutter carriage and workhead; and additional means to effect a change of velocity ratio between said feeding motions.

3. In a gear cutting machine: a cutter carriage, and a suitable cutter carried thereby; a workhead adapted to retain the blank to be cut; a feed train to impart a feeding motion to said cutter carriage; a feed train to impart a feeding motion to said workhead simultaneously with the feed of said cutter carriage; a ratio change train intermediate of said two feed trains to vary the velocity ratio between the feeds imparted to said cutter carriage and workhead; and additional means to effect a change of velocity ratio between said feeds, including two free running wheels on the feed shaft, a clutch intermediate of said wheels and slidably mounted upon said shaft, and means to cause said clutch to engage either of said wheels.

4. In a gear cutting machine: a cutting element and a work element; means to impart feeding motion to one element; means to simultaneously therewith impart a further feeding motion to one element at an angle to said former feeding motion; means to vary the velocity ratio between said feeding motions; and means to provide lost motion in one of said feeding motions.

5. In a gear cutting machine: a cutting element and a work element; means to impart feeding motion to one element; means to simultaneously therewith impart a further feeding motion to one element at an angle to said former feeding motion; means to vary the velocity ratio between said feeding motions; additional means to effect a change of velocity ratio between said feeding motions; and means to provide lost motion in one of said feeding motions.

6. In a gear cutting machine: a cutter carriage, and a suitable cutter carried thereby; a workhead adapted to retain the blank to be cut; a feed train to impart a feeding motion to said cutter carriage; a feed train to impart a feeding motion to said workhead simultaneously with the feed of said cutter carriage; a ratio change train intermediate of said two feed trains to vary the velocity ratio between the feeds imparted to said cutter carriage and workhead; and a lost motion clutch included in one of said feed trains.

7. In a gear cutting machine: a cutter carriage, and a suitable cutter carried thereby; a workhead adapted to retain the blank to be cut; a feed train to impart a feeding motion to said cutter carriage; a feed train to impart a feeding motion to said workhead simultaneously with the feed of said cutter carriage; a ratio change train intermediate of said two feed trains to vary the velocity ratio between the feeds imparted to said cutter carriage and workhead; and additional means to effect a change of velocity ratio between said feeding motions, including two free running wheels on the feed shaft, a lost motion clutch intermediate of said wheels and slidably mounted upon said shaft, and means to cause said clutch to engage either of said wheels.

8. In a bevel gear cutting machine: a cutting element and a work element; means to impart feeding motion to one element; means to simultaneously therewith impart a further feeding motion to one element at an angle to said former feeding motion; means to vary the velocity ratio between said feeding motions; means to disengage one of the feeding trains; and means to effect a relative adjustment between the two parts of the disengaged train.

9. In a gear cutting machine: a cutter carriage, and a suitable cutter carried thereby; a workhead adapted to retain the blank to be cut; a feed train to impart a feeding motion to said cutter carriage; a feed train to impart a feeding motion to said workhead simultaneously with the feed of said cutter carriage; a ratio change train intermediate of said two feed trains to vary the velocity ratio between the feeds imparted to said cutter carriage and workhead; a lost motion clutch included in one of said feeding trains to disengage the corresponding feeding means; and means to effect a relative adjustment between the two disengaged parts.

10. In a gear cutting machine: a cutter carriage, and a suitable cutter carried thereby; a workhead adapted to retain the blank to be cut; a feed train to impart a feeding motion to said cutter carriage; a feed train to impart a feeding motion to said workhead simultaneously with the feed of said cutter carriage; a ratio change train intermediate of said two feed trains to vary the velocity ratio between the feeds imparted to said cutter carriage and workhead; additional means to effect a change of velocity ratio between said feeding motions, including two free running wheels on the feed shaft, a lost motion clutch intermediate of said wheels and slidably mounted upon said shaft, means to cause said clutch to engage either of said wheels; and means to effect a relative adjustment between one of said feed trains and said ratio change train, including a shaft extending from said ratio change train and a shaft extending from one of said feed trains, a hub on one of said shafts, a worm mounted therein, and a wormwheel carried by the other of said shafts and engaging said worm.

11. In a gear cutting machine: a cutter carriage and a suitable cutter carried thereby; a workhead adapted to retain the blank to be cut; means to effect a relative motion between the cutter carriage and the workhead in the direction of the cutting angle; means to vary the velocity ratio between the cutter carriage and the workhead to cut teeth of various angularities; and means to disengage the motion producing means when the movement of either the cutter carriage or the workhead exceeds a predetermined amount.

12. In a gear cutting machine: a cutter carriage and a suitable cutter carried thereby; a workhead adapted to retain the blank to be cut; means to impart a feeding motion to said cutter carriage; means to simultaneously therewith impart a feeding motion to the workhead; and means to stop both feeding motions when the feed of either the cutter carriage or the workhead exceeds a predetermined amount.

13. In a gear cutting machine: a cutter carriage and a suitable cutter carried thereby; a workhead adapted to retain the blank to be cut; a feed train to impart a feeding motion to said cutter carriage; a feed train to impart a feeding motion to said workhead simultaneously with the feeding of said cutter carriage; means to transmit power to said feed trains; suitable fixed stops, and means carried by said cutter carriage and said workhead adapted to engage the same when the movement of either exceeds a predetermined amount; and means controlled thereby to disengage said power transmitting means.

14. In a gear cutting machine: a cutter carriage and a suitable cutter carried thereby; a workhead adapted to retain the blank to be cut; a feed train to impart a feeding motion to said workhead simultaneously with the feeding of said cutter carriage; means to transmit power to said feed trains, including a suitable clutch; suitable fixed stops; means carried by said cutter carriage and said workhead adapted to engage the said stops when the movement of either exceeds a predetermined amount; intermediate mechanism connecting said stops and said clutch, adapted to throw the latter into neutral position when the said stops are thus engaged.

15. In a gear cutting machine: a cutter carriage and a suitable cutter carried thereby; a workhead adapted to retain the blank to be cut; a feed train to impart a feeding motion to said cutter carriage; a feed train to impart a feeding motion to said workhead simultaneously with the feeding of said cutter carriage; means to transmit power to said feed trains, including a suitable clutch; a bell crank, and sliding rods connected thereto; fixed stops upon said rods; means carried respectively by said cutter carriage and said workhead adapted to engage the stops of the respective rods when the movement of either cutter carriage or workhead exceeds a predetermined amount; means to retain said bell crank normally in a given position; a clutch lever controlling said clutch; and means connecting said clutch lever with a cam surface of said bell crank to throw the said clutch into neutral position when the sliding rod stops of either rod are engaged.

16. In a gear cutting machine: a suitable cutter; a source of power; means to transmit power to said cutter to rotate the same in predetermined direction; a feed shaft positively connected with said cutter driving mechanism to drive the feed mechanism of said machine; and means to simultaneously reverse the direction of rotation of both the said cutter and feed shafts and independently of the direction of rotation of the source of power.

17. In a gear cutting machine: a suitable cutter; a power connection, and a shaft driven thereby; means to transmit power therefrom to said cutter, including two bevel gear wheels on said power shaft, a cutter shaft and a bevel gear wheel thereon intermediate of said two bevel gear wheels and adapted to be engaged thereby; a feed shaft to drive the feed mechanism of said machine; intermediate mechanism connecting the same with said cutter shaft; and means for clutching the power shaft through either of said two bevel gear wheels thereon to transmit power through said intermediate bevel gear wheel to said cutter shaft and feed shaft.

18. In a gear cutting machine: a suitable cutter; a power connection, and a shaft driven thereby; means to transmit power therefrom to said cutter, including a sleeve on said power shaft, two bevel gear wheels carried thereby, one of said wheels being slidably connected to said power shaft, a cutter shaft, a bevel gear wheel thereon and adapted to engage either of said bevel gear wheels of the power shaft, and intermediate mechanism connecting the cutter shaft with said cutter; a feed shaft to drive the feed mechanism of said machine; intermediate mechanism connecing the same with said cutter shaft; and means to slide said sleeve along its power shaft to engage either of its said bevel gear wheels with the cutter shaft bevel gear wheel.

Signed at Newark, in the county of Essex, and State of New Jersey, this 5th day of October, A. D. 1911.

HENRY J. EBERHARDT.

Witnesses:
   HENRY E. EBERHARDT,
   JOSEPH J. FECHER, Jr.